Feb. 18, 1947.  D. G. C. LUCK  2,415,955
RADIO DIRECTION FINDING
Filed Feb. 28, 1942  2 Sheets-Sheet 2
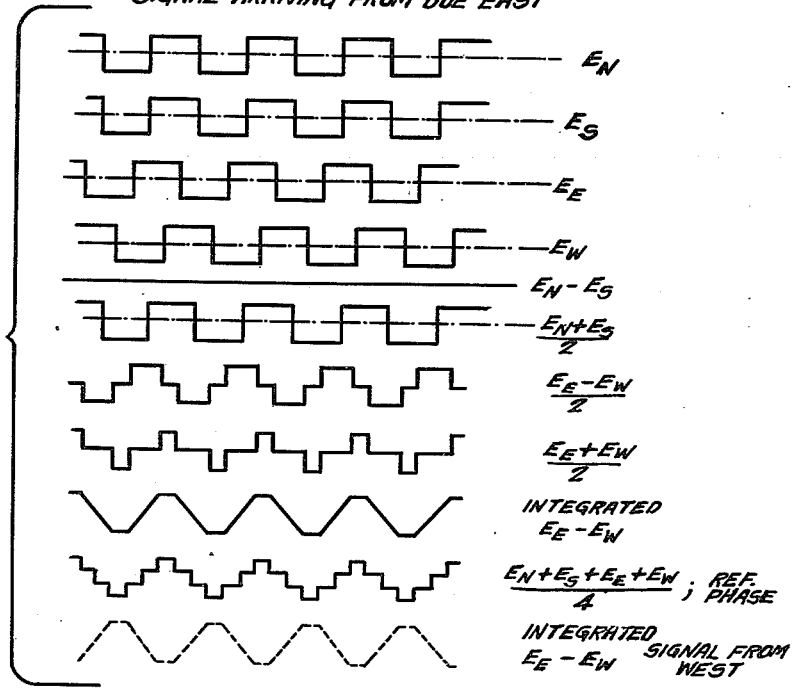
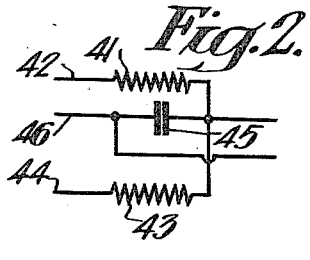
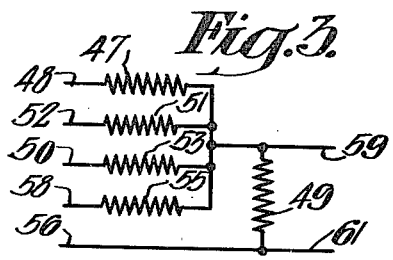
Inventor
David G. C. Luck
By C. D. Tuska
Attorney Patented Feb. 18, 1947

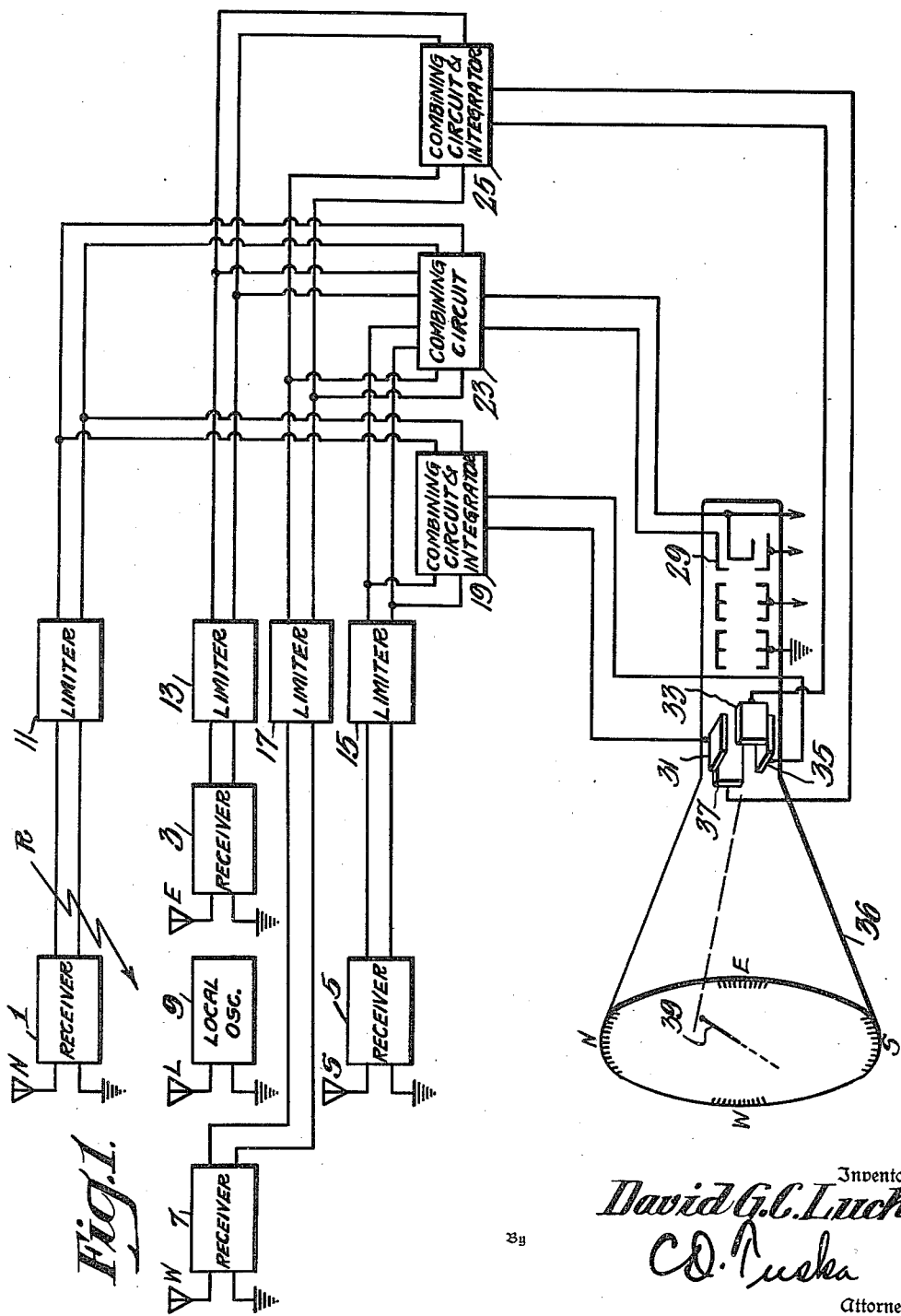

2,415,955

UNITED STATES PATENT OFFICE 2,415,955

RADIO DIRECTION FINDING

David G. C. Luck, Merchantville, N. J., assignor to Radio Corporation of America, a corporation of Delaware Application February 28, 1942, Serial No. 432,841

7 Claims. (Cl. 250—11)

1

This invention relates to radio direction finders and particularly to a device which will indicate bearings automatically in accordance with the phase differences between the voltages induced in spaced antennas by an arriving wave.

Direction finders using spaced antennas are ordinarily very critical as to the radio frequency characteristics of the coupling circuits fed by the individual antennas, since the directional information is in the form of small phase differences between the voltages picked up by the several antennas. These phase differences result from differences in the distances of the individual antennas from the source of radiation. Any inequalities in the transmission circuits from the antennas to the point where the phase differences are measured will, in the usual systems, result in inaccurate determinations of bearing.

A known means of avoiding this difficulty is the use of a locally radiated signal which is picked up with the remote signal by the antennas of the direction finder. The frequency of the local oscillator is adjusted to beat with the distant signal at a comparatively low frequency. Since the local and distant signals at each antenna are of approximately the same frequency, any phase shifts caused by the coupling network will affect both signals equally, causing no change in their phase relationship to each other. The phase directional information is thus converted to phase differences between low frequency beat voltages. In applying this local radiation principle, technical difficulties are likely to be encountered in obtaining a suitable bearing indication, especially in the case where phase differences between the voltages on the antennas of a fixed array are compared to get a direct indication without moving the antenna. An object of the present invention is to provide means whereby directional indications may be obtained without encountering these difficulties.

Small phase difference variations between two voltages of equal amplitudes may be converted to amplitude variations by subtracting one of the voltages from the other, the amplitude of the difference voltage being proportional to the phase difference between the two original voltages and the phase of the difference voltage being in quadrature with the mean of the phases of the original voltages. This cancellation method has been applied directly to antenna circuits by Adcock and many others, but in the present invention it is applied instead to the beat frequency outputs of radio receivers. The requirement of signal amplitude equality is met by extreme

2 current limiting of the beat frequency outputs, thereby avoiding critical receiver gain equalization and extending the linear relation between output magnitude and input phase difference to larger phase differences, by subtracting rectangular rather than sinusoidal waves. Whether one of the original voltages leads or lags the other in phase can be determined by comparing the phase of the difference of the two waves with that of their sum, the phase difference here being respectively plus or minus 90°. A simple phase shifter in either sum or difference circuit causes these two conditions to become, in turn, in phase and in opposite phase, so that which of the two antennas, whose signals are being compared, is nearer the transmitter is clearly shown.

The invention will be described by referring to the accompanying drawings, of which Figure 1 is a schematic diagram of the direction finder of the invention; Figure 2 is a diagram of a circuit for combining two voltages and integrating the wave form of their resultant; Figure 3 is a diagram of a similar circuit for adding a plurality of voltages, and Figure 4 is a graph illustrating how the various limiter outputs interact.

Referring to Fig. 1 of the drawings, four vertical antennas N, E, S and W are positioned at the corners of an imaginary square, and a fifth vertical antenna L is positioned at the center, equidistant from the corner antennas. A local oscillator 9 is adjusted to a frequency near that of an incoming radio wave, R, of which the direction of arrival is to be determined and radiates energy through antenna L equally and cophasally to each of the outer antennas. A wave arriving at the antennas from a distant transmitter will induce voltages of equal amplitudes but differing phases in the antennas N, E, S and W. These voltages, together with the voltages induced in the antennas by the local oscillator, are fed to receivers 1, 3, 5 and 7, respectively. The output of each receiver will include a beat frequency component voltage as a result of the simultaneous detection of the signals from the local and distant sources. The phase angles between the beat frequency voltages derived from the different antennas are related to the angle of arrival of the wave from a distant transmitter in the same way as the phase angles between the voltages induced in the antennas by the wave are related to its direction of arrival, because any radio frequency phase shifts caused by the antenna coupling networks in the distant signal voltage are duplicated by corresponding phase shifts in the local signal voltage, and the angle between the two is unchanged. The amplitudes of the beat voltages at the outputs of the receivers are likely to differ appreciably, since it is substantially impossible to maintain the gains of the four receivers exactly equal. The beat frequency voltages are fed from the receiver outputs through limiters 11, 13, 15 and 17, respectively, which clip off the peaks at a constant level, leaving substantially rectangular waves of uniform amplitudes, as illustrated by the first four oscillograms in Fig. 4, designated respectively $E_n$, $E_s$, $E_e$, and $E_w$. These oscillograms represent the beat-frequency voltages appearing in the output circuits of the limiters as a result of a wave reaching the antennas from the direction of antenna E along the line between antennas E and W. It is apparent from the drawing that in this case $E_n$ and $E_s$ are phase, while $E_e$ and $E_w$ differ in phase from $E_n$ and $E_s$ in opposite directions and by the same amount, which is to be expected from consideration of the fact that antennas N and S are equidistant from the transmitter, while antenna E is closer and antenna W is further by the same amount. The voltages $E_n$ and $E_s$ are combined in the circuit 19, producing the result shown as $$\frac{E_n - E_s}{2}$$

in Figure 4 which is, in this case, zero. The voltages $E_e$ and $E_w$ are combined in the circuit 25, producing the result shown in the line marked $$\frac{E_e - E_w}{2}$$

of Fig. 4.

This is seen to be a wave comprising rectangular pulses of alternate polarities and of durations which are in a ratio to the length of the pulses of $E_e$ and $E_w$ proportional to the phase angle between $E_e$ and $E_w$. Referring to Figure 2, a circuit suitable for combining voltages in the above described manner, and integrating the resultant, is shown. The output of one limiter is connected between the terminals 42 and 46, and the output of the other limiter is connected between the terminals 44 and 46. Resistors 41 and 43 are equal to each other and much greater in value than the impedance of their common load, so that the voltage developed across the load will be substantially proportional to the algebraic sum of the voltages applied to the circuit. The limiters are connected to the circuit in subtractive relationship, so the output of the combining circuit is actually proportional to the arithmetic difference between the input voltages. The common load referred to above is substantially constituted by a condenser 45, which is connected across the output terminals of the combining circuit and acts as an integrator with respect to time. The function of the integrators is shown by comparing the lines in Fig. 4 marked $$\frac{"E_e - E_w"}{2}$$

and "integrated $E_e - E_w$." It is seen that the rectangular wave $E_e - E_w$ is smoothed to a flat-topped trapezoidal wave of the same frequency, and shifted substantially 90° in phase. This trapezoidal curve is actually the time integral of the curve $E_e - E_w$. The amplitudes of the integrated waves are proportional to the ratio of the lengths of the pulses $E_e - E_w$ to the lengths of the pulses of $E_e$ or $E_w$, and hence to the phase angle between $E_e$ and $E_w$. Referring again to Fig. 1, the voltage from the circuit 19, which is derived originally from the antennas N and S, is applied to the vertical deflecting plates 31 and 35 of a cathode ray tube, 36, and the voltage from the circuit 25 is applied to the horizontal deflecting plates 33 and 37. The integrated voltages $E_n - E_s$ and $E_e - E_w$ are in phase with each other and will cause a linear trace 39 to appear on the screen of the cathode ray tube 36. The amplitudes of the integrated difference voltages are respectively proportional to the phase angles between the voltages induced in antennas N and S and between those induced in antennas E and W by the arriving wave, and hence are respectively proportional to the cosine and the sine of the angle between the direction of arrival of the wave and the line through antenna N and S. As a result of this relationship, the trace 39 appearing on the cathode ray tube screen will be disposed at an angle to the line marked N—S equal to the angle of arrival of the wave. This trace would normally extend an equal distance on each side of the center of the screen, resulting in a 180° ambiguity in the indication. In the system of the invention, such ambiguity is avoided by deriving a voltage which has a phase equal to the mean of the phases of the beat voltages obtained from the antennas N, E, S, and W, and using said voltage to cut off or defocus one end of the trace on the screen of the cathode ray tube. This is done by adding the voltages $E_n$, $E_e$, $E_s$, and $E_w$ in a combining circuit 23 (Fig. 1) to obtain a voltage proportional to their sum and designated as $$\frac{E_n + E_s + E_e + E_w}{4}$$

in Figure 4. This voltage is applied to a control electrode 29 of the cathode ray tube 36. The combining circuit 23 is illustrated in Figure 3; the resistors 47, 51, 53 and 55 are equal to each other and of much higher resistance than the resistor 49. The voltages $E_n$, $E_e$, $E_s$, and $E_w$ are applied between terminals 48 and 56, 52 and 56, 50 and 56, and 58 and 56, respectively. The resultant voltage is taken from terminals 59 and 61 across resistor 49 and is substantially proportional to the sum of the input voltages. No filtering or integration of this voltage is required since it is merely used to bias the control electrode 29. The dotted curve, integrated $E_e - E_w$ is shown in Fig. 4 to illustrate the result of signal arriving from due west, for comparison with the solid curve of integrated $E_e - E_w$ resulting from a signal arriving from the east. It is apparent that the signal from the west produces an integrated $E_e - E_w$ wave similar to, but 180° out of phase with, a signal from the east.

For convenience in using the direction finder with signals of different frequencies, the tuning controls of the radio frequency circuits of the receivers 1, 3, 5 and 7 should be ganged together with a control for changing the frequency of the oscillator 9 to maintain a constant beat frequency. The selection of the beat frequency is limited. The fact is that if it is made too high, the frequencies of the local and distant signals will be so far apart that they will be treated differently by the radio frequency circuits, and if it is made too low, there is a possibility of audio interference between the beat and any audio modulation on the distant signal. An advantage of maintaining a constant beat frequency is that the receivers may operate as superheterodynes without a separate oscillator for each one. The radio frequency circuits must be tuned only sharply enough for image suppression in order to avoid critically rapid changes in phase shift with frequency and consequent dissimilar treatment of the signals from the local and distant sources.

Thus the invention has been described as a direct indicating direction finder. It is worthy of note that the bearing indications are not subject to the octantal spacing errors of the ordinary Adcock, because the voltages applied to the indicator are derived from overlapping spare waves rather than sine waves, and are directly proportional to antenna phase differences, rather than to the sines of the phase differences. For this reason the antennas may be spaced by as much as one-half wavelength, resulting in a correspondingly high sensitivity of the system, without introducing substantial errors, provided the signal does not arrive simultaneously along a plurality of paths, causing diversity errors due to differing cancellation effects at different antenna locations between signals arriving at various angles of elevation and at random phases with one another.

Since the system of the invention works entirely on the effect of antenna spacing in a horizontal plane, it is free from errors due to oblique wave polarization and incidence. The effect of a wave arriving at some angle of elevation rather than horizontally is merely to produce a shorter trace on the cathode ray tube, without affecting the angle of the trace. The reason for this is that a wave coming down at an angle arrives at the different antennas more nearly in phase than if it were arriving horizontally. The beat-frequency voltages from the limiters similarly are displaced less in phase, and upon combination in the combining circuits result in voltages of lower amplitudes. However, the ratio of the amplitudes of the voltages remains the same, and hence the angle of the trace on the screen of the cathode ray tube is unaffected. Since the length of the trace is proportional to the amplitudes of the combined beat voltages, it is a direct indication of the cosine of the angle of elevation of the arriving wave. It is not affected by wide variations in signal strength, because of the action of the limiters. Also, the receivers may be equipped with a usual automatic gain control, resulting in still further independence of variations in signal strength.

I claim as my invention:

1. A radio direction finder including in combination an array of pairs of spaced stationary antennas, a local radiation source, and a plurality of radio receivers connected to said antennas whereby a wave arriving at said antenna array will produce a beat voltage at the output of each receiver having a frequency equal to the difference in the frequencies of the local source and the arriving wave, said beat voltages being related in phase in accordance with the direction of arrival of said wave, a limiter device connected in the output of each of said receivers whereby the peaks of the waves of said beat voltages are clipped off at a constant amplitude, a cathode ray indicator including pairs of deflecting elements and a control element, means for combining differentially the resulting waves derived from one pair of antennas and applying the resultant voltage to one pair of said deflecting elements, means for combining differentially the corresponding waves derived from another pair of antennas and applying the resultant voltage to another pair of said deflecting elements, means for combining additively the waves derived from all of the antennas to produce a reference phase voltage and applying said voltage to said control electrode whereby one half of the luminous trace appearing on the screen of said tube is differentiated from the other half of said trace.

2. A radio direction finder comprising in combination an array of pairs of spaced stationary antennas, radio receivers respectively connected to each of said antennas, and a local source of radiation, whereby the voltage induced in each of said antennas by an arriving wave is combined with the voltage induced therein by the local radiation source to produce a beat frequency voltage, pairs of limiters connected respectively in the output circuit of each of said receivers to clip off the peaks of the waves of said beat frequency voltages at a constant amplitude, thereby converting said beat frequency voltage waves to substantially rectangular waves of equal and constant amplitude, a circuit for subtractively combining said rectangular wave outputs from one pair of said limiters and integrating the resultant to produce a voltage of trapezoidal wave form, a circuit for subtractively combining said rectangular wave outputs from another pair of said limiters and integrating the resultant to produce a second voltage of trapezoidal wave form, and a circuit for additively combining the outputs from all of said limiters to produce a voltage of step-shaped wave form, and an amplitude comparing device provided with rectangularly disposed amplitude responsive elements which are connected to be energized by said first and second trapezoidal wave form voltages and a polarity-responsive control element connected to be energized by said voltage of step-shaped wave form, whereby an indicator element of said amplitude comparing device is deflected in a direction corresponding to the direction of arrival of said wave.

3. A radio direction finder comprising, in combination, an array of antennas, radio receivers respectively connected to each of said antennas, and a local source of radiation, whereby the voltage induced in each of said antennas by an arriving wave is combined with the voltage induced by the local radiation source to produce a beat frequency voltage; limiters respectively connected in the output circuit of each of said receivers to maintain the amplitudes of said beat frequency voltages constant, a circuit for subtractively combining the output voltages of one pair of said limiters, a second circuit for subtractively combining the output voltages of another pair of said limiters, and a third circuit for additively combining the outputs of all of said limiters; and a vector amplitude comparing device provided with rectangularly disposed amplitude responsive elements which are connected to be energized by the outputs of said first and second subtractively combining circuits, and a polarity-responsive control element connected to be energized by the output of said additively combining circuit, whereby an indicator element of said amplitude comparing device is deflected in a direction corresponding to the direction of arrival of said wave.

4. The method of determining the azimuth of arrival of a radio wave comprising the steps of receiving said wave at spaced points to derive therefrom a pair of voltage waves bearing a phase relationship to each other which is a predetermined function of said azimuth, limiting the amplitudes of said voltage waves to constant values, differentially combining said limited waves to produce a resultant wave having an amplitude dependent upon the phase difference of said two voltage waves and independent of their amplitudes, and measuring the amplitude of said resultant wave.

5. The method of determining the azimuth of arrival of a radio wave comprising the steps of receiving said wave at spaced points to derive therefrom a pair of voltage waves bearing a phase relationship to each other which is a predetermined function of said azimuth, limiting the amplitude of said voltage waves to constant values, subtractively combining said limited waves to produce a first resultant wave, additively combining said limited waves to produce a second resultant wave, measuring the amplitude of said first resultant wave, shifting the phase of said first resultant wave by ninety degrees and comparing the polarity of said second resultant wave with the polarity of said shifted first resultant wave.

6. The method of determining the azimuth of arrival of a radio wave comprising the steps of receiving said wave at spaced points to derive therefrom a pair of voltage waves bearing a phase relationship to each other which is a predetermined function of said azimuth, cutting off the peaks of said waves at a constant level to produce rectangular waves of equal amplitudes, combining said rectangular waves differentially, integrating the resultant to produce a trapezoidal wave, and measuring the amplitude of said trapezoidal wave.

7. The method of determining the azimuth of arrival of a radio wave comprising the steps of receiving said wave at spaced points to derive therefrom pairs of voltage waves bearing phase relationships to each other which are predetermined functions of said azimuth, limiting the amplitudes of said voltage waves to constant values, differentially combining each pair of said limited waves to produce resultant waves having amplitudes dependent on the phase differences of said pairs of voltage waves, and measuring the amplitudes of said resultant waves.

DAVID G. C. LUCK.

REFERENCES CITED

The following references are of record in the file of this patent:

UNITED STATES PATENTS

| Number | Name | Date |
|---|---|---|
| 1,984,545 | Peterson | Dec. 18, 1934 |
| 2,281,995 | Purington | May 5, 1942 |
| 2,213,273 | Earp | Sept. 3, 1940 |
| 2,213,874 | Wagstaffe | Sept. 3, 1940 |